United States Patent [19]

Fuller et al.

[11] 4,019,985

[45] Apr. 26, 1977

[54] METHODS FOR FLUIDIZING A FILTER MEDIA

[75] Inventors: Matthew H. Fuller, Richmond, Va.; William R. Deever, Beaumont, Tex.

[73] Assignee: Texaco Inc., New York, N.Y.

[22] Filed: June 17, 1976

[21] Appl. No.: 697,292

Related U.S. Application Data

[63] Continuation-in-part of Ser. No. 600,259, July 30, 1975, abandoned.

[52] U.S. Cl. .................................. 210/80; 210/82
[51] Int. Cl.² ........................................ B01D 23/24
[58] Field of Search .......... 210/123, 274, 275, 279, 210/290, 80, 82; 55/390

[56] References Cited

UNITED STATES PATENTS

| 384,539 | 6/1888 | Oliphant | 210/274 |
|---|---|---|---|
| 961,180 | /1910 | Utley | 210/274 |
| 2,309,916 | /1943 | Palmer | 210/123 |
| 2,789,696 | /1957 | Jahnig et al. | 210/80 |
| 2,992,986 | /1961 | Ingram | 210/274 |

FOREIGN PATENTS OR APPLICATIONS

| 1,009,439 | 1952 | France | 55/390 |

*Primary Examiner*—Frank A. Spear, Jr.
*Assistant Examiner*—E. Rollins Cross
*Attorney, Agent, or Firm*—Carl G. Ries; Theron H. Nichols; Thomas H. Whaley

[57] ABSTRACT

Two basic methods for rapidly fluidizing a plug and two vertical flow filters for carrying out the methods are disclosed. One method comprises injecting a horizontal high pressure plug-breaking-up fluid jet at the bottom portion of the plug for breaking up that portion, injecting another horizontal plug-breaking-up jet at the plug at a predetermined distance above the previous fluid jet for breaking up the next lower portion of the plug, and continuing injecting successive horizontal plug-breaking-up jets, each jet being spaced above the last jet until all of the plug is broken up for rapidly fluidizing the filter media plug. The other method starts fluidizing at the top of the plug and works down. Another method comprises injecting a plurality of horizontal high pressure plug-breaking-up fluid jets simultaneously at the bottom portion of an elongated horizontal plug in a horizontal flow filter for breaking up that portion, injecting another plurality of horizontal plug-breaking-up fluid jets simultaneously at the horizontal plug at a predetermined distance above the previous fluid jets for breaking up the next lower portion of the plug, and continuing injecting successive groups of horizontal plug-breaking-up jets, each group of jets being spaced above the last group until all of the elongated horizontal plug is broken up for rapidly fluidizing the elongated horizontal filter media plug.

12 Claims, 5 Drawing Figures

METHODS FOR FLUIDIZING A FILTER MEDIA

This is a continuation-in-part of application Ser. No. 600,259, filed July 30, 1975, now abandoned.

BACKGROUND OF THE INVENTION

Fluidizing granular media filters for backwash operation becomes a problem as filter media has a tendency to lift and rise as a plug rather than as discrete particles. Past attempts to fluidize the plug have been injecting air straight up from the bottom, protruding solid rods down from the top, and utilizing vibrators for breaking up and fluidizing the plug. A few prior filters are disclosed in U.S. Pat. Nos. 384,539; 961,180; 2,309,916; 2,789,696; 2,992,987; and French Pat. No. 1,009,439 of Mar. 12, 1952, each of which has its own different method for filtering and backwashing. Likewise, none of the above disclosed filters has the problem of breaking up its plug, if one should form, much less disclose a plug-breaking-up means or high velocity, narrow stream nozzle, as distinguished from a low pressure, low volume, spray of fluid bed nozzle.

OBJECTS OF THE INVENTION

The primary object of this invention is to provide a method for rapidly fluidizing or breaking up a plug of filter media in a vertical, downward flow, granular media filter.

A further object of this invention is to provide a method for rapidly fluidizing a plug or filter media in a vertical downward flow filter by injecting a high pressure, narrow stream, fluid plug-breaking-up jet 90° to the plug for breaking up the lower end portion of the plug, injecting another high pressure fluid, plug-breaking-up jet parallel to and above the first jet for breaking up the next lower portion of the plug, and continuing injecting successive and consecutive high pressure fluid plug-breaking-up jets at the plug until all of the plug is broken up and fluidized.

Still another object of this invention is to provide a method for rapid fluidizing of a granular media vertical filter plug that is easy to operate, comprises simple method steps, and is economical to operate.

Other objects and various advantages of the disclosed method for rapid fluidizing of a granular media vertical filter plug will be apparent from the following detailed description, together with the accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, two forms of filters for carrying out the methods of the invention.

DESCRIPTION OF THE INVENTION

Figure 1:
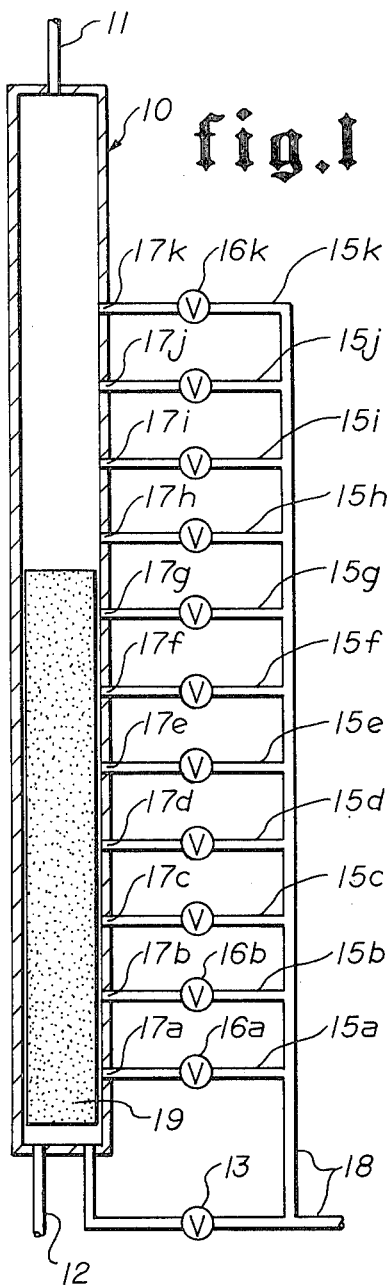
FIG. 1 is a schematic vertical view of a rapid fluidizing granular media vertical elongated filter with parts in section and with parts deleted for clarity of disclosure.

The invention disclosed herein, the scope of which being defined in the appended claims, is not limited in its application to the details of construction and arrangement of parts shown and described for carrying out the disclosed methods, since the invention is capable of other embodiments for carrying out other methods and of being practiced or carried out in various other ways. Also, it is to be understood that the phraseology or terminology employed herein in for the purpose of description and not of limitation. Further many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises a few methods for rapidly fluidizing a plug of filter media in a vertical downward flow, granular media filter.

The basic method of breaking up or fluidizing a plug during backwash operation comprises the following method steps:

1. Breaking up a lower portion of the plug with a horizontal high pressure plug-breaking-up fluid jet injecting into the plug at a predetermined distance above the bottom of the plug,
2. Breaking up the next lower portion of the plug with a horizontal high pressure plug-breaking-up fluid jet injecting into the plug at a predetermined distance above the previous horizontal plug-breaking-up fluid jet, and
3. Continuing the breaking up of successive and consecutive next lower portions of the plug with successive and consecutive horizontal high pressure plug-breaking-up fluid jets, each fluid jet injecting into the plug at a predetermined distance above the last horizontal high pressure plug-breaking up fluid jet until all of the plug is broken up for rapidly breaking up and fluidizing a filter media plug.

Details of one method for rapidly breaking up and fluidizing a vertical elongated plug of filter media comprises the steps of, 1. breaking up a lower portion of the vertical elongated plug with a horizontal high pressure plug-breaking-up fluid jet injecting into the vertical elongated plug at a predetermined distance above the bottom of the vertical elongated plug,
2. breaking up the next lower portion of the vertical elongated plug with a horizontal high pressure plug-breaking-up fluid jet injecting into the vertical elongated plug at a predetermined distance above the previous horizontal plug-breaking-up fluid jet, and
3. continuing the breaking up of successive and consecutive next lower portions of the vertical elongated plug with successive and consecutive horizontal high pressure plug-breaking-up fluid jets, each plug-breaking-up fluid jet injecting into the vertical elongated plug at a predetermined distance above the last horizontal high pressure plug-breaking-up fluid jet until all of the vertical elongated plug is broken up for rapidly breaking up and fluidizing a vertical elongated filter media plug.

Details of another method for rapidly breaking up and fluidizing a horizontal elongated plug of filter media comprises the steps of, 1. breaking up a lower portion of the horizontal elongated plug with a group of horizontal high pressure plug-breaking-up fluid jets injecting into the horizontal elongated plug at a predetermined distance above the bottom of the horizontal elongated plug, 2. breaking up the next lower portion of the horizontal elongated plug with another group of horizontal high pressure plug-breaking-up fluid jets injecting into the horizontal elongated plug at a predetermined distance above the bottom of the horizontal elongated plug, and 3. continuing the breaking up of successive and consecutive next lower portions of the horizontal elongated plug with successive and consecutive groups of horizontal high pressure plug-breaking-up fluid jets, each group of plug-breaking-up fluid jets injecting into the horizontal elongated plug at a predetermined distance above the last group of horizontal high pressure plug-breaking-up fluid jets until all of the horizontal elongated plug is broken up for rapidly breaking up and fluidizing a horizontal elongated filter media plug.

Another basic method for rapidly fluidizing a plug for filter media in a vertical, downward flow, granular media filter comprises the steps of:

1. injecting a horizontal high pressure, plug-breaking-up fluid jet at the plug at a predetermined distance below the top of the plug for contacting and breaking up an upper portion of the plug, 2. injecting another horizontal high pressure plug-breaking-up fluid jet at the plug at a predetermined distance below the previous horizontal high pressure plug-breaking-up fluid jet for breaking up the next upper portion of the plug, and 3. continuing injecting successive horizontal high pressure plug-breaking-up fluid jets, each horizontal high pressure plug-breaking-up fluid jet being at a predetermined distance below the last horizontal high pressure plug-breaking-up fluid jet until all of the plug is broken up for rapidly breaking up and fluidizing a filter media plug.

Either of the above two basic methods may be modified further by, 4. injection of each horizontal high pressure plug-breaking-up fluid jet against its respective plug portion is ceased after its respective plug portion is broken up and fluidized.

OR 5. injection of each horizontal high pressure plug-breaking-up fluid jet against its respective portion of the plug in succession is ceased only after the last portion of the plug is broken up and fluidized.

The methods above may be modified further by the utilization of streams of high pressure plug-breaking-up liquid jets for the fluid jets recited.

GRANULAR MEDIA FILTER

FIG. 1 illustrates one embodiment of the rapid fluidizing granular media vertical filter 10 for practicing the methods. The filter 10, as set forth in more detail in inventors+ co-pending, co-assignee application filed concurrently herewith, is illustrated schematically as a vertical, cylindrical elongated chamber with filter influent entering from the top through conduit 11 and filter effluent is exhausted through lower conduit 12.

Backwash control valve 13 controls high pressure backwash water through conduit 14 and which backwash effluent may exit through conduit 11.

The main feature of the disclosed filters is a series of vertically, equally spaced apart, fluidizing lines 15a–15k, each having a valve, as valve 16a and a nozzle, as nozzle 17a for ejecting a high pressure fluid stream or jet, such as, but not limited to, a water jet supplied from a central source main line 18. The valves 16 are operable in succession for being opened consecutively starting at either the bottom of the filter 10a and accordingly the bottom of a granular cake or plug 19 to the broken up and fluidized, or at the top of the plug and opened and closed in succession going down. The nozzles 17a–17k or plug-breaking-up means are in vertical alignment and spaced an equal predetermined distance apart. These plug-breaking-up nozzles comprise high velocity, narrow stream liquid nozzles, as distinguished from low pressure, low volume spray nozzles.

OPERATION

Briefly, in operation of the rapid fluidizing granular media vertical filter 10, FIG. 1, for practicing the above methods, with start of upward backwash flow, valve 16a is opened to supply line 15a and accordingly nozzle 17a, or plug-breaking-up means, with high pressure fluid or liquid jet which breaks up or fluidizes the lower portion of the plug 19 prior to rise of the plug due to the backwash. If the plug 19 has already raised or floated upwardly a small distance, then the first valve to open must be that one that will break up the lower portion of the plug.

Then after this plug lower portion is fluidized, the first valve 16a is turned off, the flow in the line 15a the nozzle 17a ceased, and the next valve 16b is opened. Then line 15b supplies the second nozzle 17b, spaced a predetermined distance above the first nozzle, with high pressure fluid to eject a jet against the remaining or next lower portion of the plug 19. After that plug lower portion is broken up or fluidized, the jet is ceased, and the next valve above is opened in succession. Thus the succeeding valves are opened and closed in succession until the last jet breaks up the last portion of the plug. No more valves are actuated.

Further, the valves are operable in succession, likewise starting with the valve at the top of the plug which is opened first for its nozzle to break up the top portion of the plug. Then the succeeding valves below this valve at the top of the plug are opened and closed in succession to break up the plug from the top down during backwash operation.

Likewise the valves are operable, alternatively, so that after each valve is turned on, it remains on until the last portion of the plug is fluidized. Then all valves and their respective nozzles are turned off simultaneously.

Figure 3:
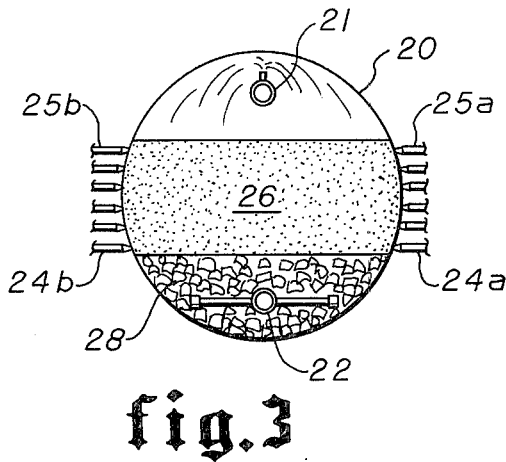
FIG. 3 is a sectional view of the modification of FIG. 2.
Figure 2:
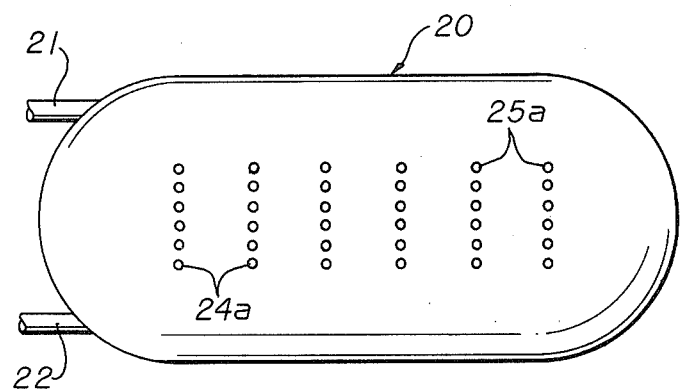
FIG. 2 is a schematic side view of a second filter.
Figure 5:
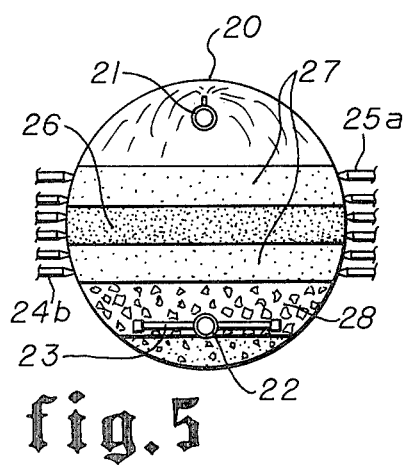
FIG. 5 is a sectional view of FIG. 4.
Figure 4:
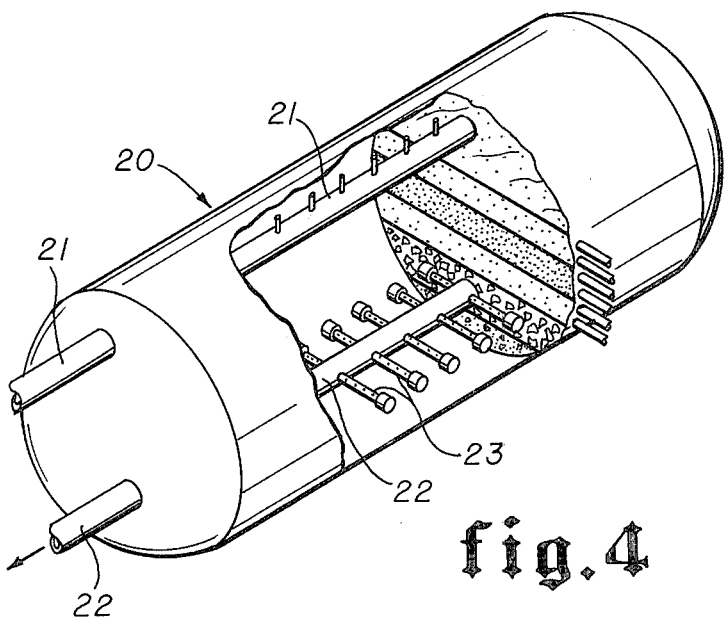
FIG. 4 is a schematic detailed perspective view of the modification of FIG. 2.

FIG. 2 illustrates in side view schematically, a modified filter for practicing the above described methods for fluidizing a filter media and particularly a filter media plug. FIG. 3 is a schematic end view of FIG. 2, FIG. 4 is a more detailed perspective view of the modified horizontal filter, and FIG. 5 is a detailed sectional view of FIG. 4. This filter comprises a horizontal cylinder 20, FIG. 4, particularly, having an inlet header 21 for supplying filter influent thereto and an underdrain header 22 with laterals 23 for discharge of the filter effluent. Backwash is controlled similarly to that in the first embodiment of FIG. 1.

Externally of the filter a first and lower horizontal row of plug-breaking-up fluidizing nozzles 24a and 24b is illustrated on FIG. 3 as being on opposite sides of the horizontal cylinder 20. More horizontal rows of nozzles are equally spaced above the bottom row to the top row of nozzles 25a and 25b. The individual nozzles of each horizontal row may form vertical rows of nozzles, equally spaced apart, on opposite sides of the horizontal cylinder 20. An elongated horizontal plug 26 may be formed internally of the cylinder in filter media 27 and resting on media support bed 28 comprising, for example, of rocks of decreasing size stacked on top of each other, or alternatively, it may comprise layers of coarse gravel, garnet sand, coarser sand, and coal for a top layer with the plug forming between the interfaces of the latter two layers.

In operation of the second embodiment of FIGS. 2-5 a liquid, such as but not limited to, water is squirted from the fluidizing nozzles at high pressure and high volume in contrast to the conventional low pressure, low volume spray nozzles. The control system (not shown, but similar to that of FIG. 1) first turns on all of the nozzles in the bottom horizontal rows 24a and 24b on both sides simultaneously. After the bottom portion of the plug 26 contacted by the high pressure narrow streams of water is fluidized, this row of nozzles is cut off and simultaneously, the next higher row of nozzles is turned on and that remaining low plug portion is fluidized. This procedure is repeated until the upper and final portion of the plug is fluidized by the upper row of fluidizing nozzles 25a, 25b.

Likewise, if so desired, and the filter so dictates, the first portion of the plug to be fluidized may be the upper portion by nozzles 25a, 25b, and the plug fluidizing worked down to the last remaining plug portion which is fluidized by the lower fluidizing nozzles 24a, 24b.

FIG. 5 is a detailed view of the sectional view of FIG. 3 illustrating an alternate breakdown of the plug 26. Here, the plug 26 is shown between two interfaces of the filter media 27. The underdrain header 22 is shown with its laterals 23 resting on a concrete rest for example and covered with the support media 28. Thus both the filter media 27 and the plug 26 may rise as one plug and all of which would be fluidized by the fluid nozzle.

Obviously other methods may be utilized for fluidizing a plug in the embodiments of either FIG. 1 or FIG. 2 than those listed above, depending on the particular filter and filtrate desired to be utilized.

Accordingly, it will be seen that the two disclosed basic methods will operate in a manner which meets each of the objects set forth hereinbefore.

While only two methods of the invention and two mechanisms for carrying out the methods have been disclosed, it will be evident that various other methods and modifications are possible in the arrangement and construction of the disclosed methods and mechanisms without departing from the scope of the invention and it is accordingly desired to comprehend within the purview of this invention such modifications as may be considered to fall within the scope of the appended claims.

We claim:

1. A method for rapidly breaking up and fluidizing a plug of filter media comprising the steps of,
   a. breaking up a lower portion of the plug with a horizontal high pressure plug-breaking-up fluid jet injecting into the plug at a predetermined distance above the bottom of the plug,
   b. breaking up the next lower portion of the plug with a horizontal high pressure a plug-breaking-up fluid jet injecting into the plug at a predetermined distance above the previous horizontal plug-breaking-up fluid jet, and
   c. continuing the breking up of successive and consecutive next lower portions of the plug with successive and consecutive horizontal high pressure plug-breaking-up fluid jets, each fluid jet injecting into the plug at a predetermined distance above the last horizontal high pressure plug-breaking-up fluid jet until all of the plug is broken up for rapidly breaking up and fluidizing a filter media plug.

2. In a vertical elongated granular media filter, a method for rapidly breaking up and fluidizing a vertical elongated plug of the filter media comprising the steps of,
   a. breaking up a lower portion of the vertical elongated plug with a horizontal high pressure plug-breaking-up fluid jet injecting into the vertical elongated plug at a predetermined distance above the bottom of the vertical elongated plug,
   b. breaking up the next lower portion of the vertical elongated plug with a horizontal high pressure plug-breaking-up fluid jet injecting into the vertical elongated plug at a predetermined distance above the previous horizontal plug-breaking-up fluid jet, and
   c. continuing the breaking up of successive and consecutive next lower portions of the vertical elongated plug with successive and consecutive horizontal high pressure plug-breaking-up fluid jets, each plug-breaking-up fluid jet injecting into the vertical elongated plug at a predetermined distance above the last horizontal high pressure plug-breaking-up fluid jet until all of the vertical elongated plug is broken up for rapidly breaking up and fluidizing a vertical elongated filter media plug.

3. In a horizontal elongated granular media filter, a method for rapidly breaking up and fluidizing a horizontal elongated plug of the filter media comprising the steps of,
   a. breaking up a lower portion of the horizontal elongated plug with a group of horizontal high pressure plug-breaking-up fluid jets injecting into the horizontal elongated plug at a predetermined distance above the bottom of the horizontal elongated plug,
   b. breaking up the next lower portion of the horizontal elongated plug with another group of horizontal high pressure plug-breaking-up fluid jets injecting into the horizontal elongated plug at a predetermined distance above the bottom of the horizontal elongated plug, and
   c. continuing the breaking up of successive and consecutive next lower portions of the horizontal elongated plug with successive and consecutive groups of horizontal high pressure plug-breaking-up fluid jets, each group of plug-breaking-up fluid jets injecting into the horizontal elongated plug at a predetermined distance above the last group of horizontal high pressure plug-breaking-up fluid jets until all of the horizontal elongated plug is broken up for rapidly breaking up and fluidizing a horizontal elongated filter media plug.

4. A method for rapidly fluidizing a plug of filter media in a vertical, downward flow, granular media filter comprising the steps of,
   a. injecting backwash fluid upwardly in the filter to float the filter media plug,
   b. injecting a horizontal high pressure plug-breaking-up fluid jet at the plug at a predetermined distance above the bottom of the plug for contacting and breaking up a lower portion of the plug, c. injecting another horizontal high pressure plug-breaking-up fluid jet at the plug at a predetermined distance above the previous horizontal high pressure plug-breaking-up fluid jet for breaking up the next lower portion of the plug, and d. continuing injecting successive and consecutive horizontal high pressure plug-breaking-up fluid jets, each horizontal high pressure plug-breaking-up fluid jet until all of the plug is broken up for rapidly breaking up and fluidizing a filter media plug.

5. A method for rapidly fluidizing a plug as recited in claim 4 comprising, a. injecting all of the horizontal high pressure plug-breaking-up fluid jets equal distances above each other.

6. A method for rapidly fluidizing a plug as recited in claim 4 wherein, a. injection of each horizontal high pressure plug-breaking-up fluid jet against its respective plug portion is ceased after its respective plug portion is broken up and fluidized.

7. A method for rapidly fluidizing a plug as recited in claim 4 wherein, a. injection of each horizontal high pressure plug-breaking-up fluid jet against its respective portion of the plug in succession is ceased only after the last portion of the plug is broken up and fluidized.

8. A method for rapidly fluidizing a plug of filter media in a vertical, downward flow, granular media filter comprising the steps of, a. injecting backwash fluid upwardly in the filter to float the plug, b. injecting a horizontal high pressure plug-breaking-up fluid jet at the plug at a predetermined distance below the top of the plug for contacting and breaking up an upper portion of the plug, c. injecting another horizontal high pressure plug-breaking-up fluid jet at the plug at a predetermined distance below the previous horizontal high pressure plug-breaking-up fluid jet for breaking up the next upper portion of the plug, and d. continuing injecting successive horizontal high pressure plug-breaking-up fluid jets, each horizontal high pressure plug-breaking-up fluid jet being at a predetermined distance below the last horizontal high pressure plug-breaking-up fluid jet until all of the plug is broken up for rapidly breaking up and fluidizing the filter media plug.

9. A method for rapidly fluidizing a plug as recited in claim 8 comprising, a. injecting all of the horizontal high pressure plug-breaking-up fluid jets equal distances above each other.

10. A method for rapidly fluidizing a plug as recited in claim 8 wherein, a. injecting of each horizontal high pressure plug-breaking-up fluid jet against its respective portion of the plug is ceased after its respective portion of the plug is broken up and fluidized.

11. A method for rapidly fluidizing a plug as recited in claim 8 wherein, a. injection of each horizontal high pressure plug-breaking-up fluid jet against its respective portion of the plug in succession is ceased only after the last portion of the plug is broken up.

12. A method for rapidly fluidizing a plug as recited in claim 8 wherein, a. the horizontal high pressure plug-breaking-up fluid jets are streams of liquid.

* * * * *